(12) United States Patent
Groves et al.

(10) Patent No.: US 10,229,765 B2
(45) Date of Patent: Mar. 12, 2019

(54) COMPACT RADIATION GENERATOR

(75) Inventors: Joel Lee Groves, Leonia, NJ (US);
Luke T. Perkins, Plainsboro, NJ (US);
Fabien Guizelin, Gelugor (MY); Peter Wraight, Skillman, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1066 days.

(21) Appl. No.: 13/510,243

(22) PCT Filed: Nov. 15, 2010

(86) PCT No.: PCT/US2010/056658
§ 371 (c)(1),
(2), (4) Date: Apr. 26, 2013

(87) PCT Pub. No.: WO2011/060343
PCT Pub. Date: May 19, 2011

(65) Prior Publication Data
US 2013/0208840 A1    Aug. 15, 2013

Related U.S. Application Data

(60) Provisional application No. 61/261,394, filed on Nov. 16, 2009, provisional application No. 61/261,398, filed on Nov. 16, 2009.

(51) Int. Cl.
*G21G 4/02* (2006.01)
*H05H 3/06* (2006.01)

(52) U.S. Cl.
CPC ............... *G21G 4/02* (2013.01); *H05H 3/06* (2013.01)

(58) Field of Classification Search
CPC ................................. G21G 4/02; H05H 3/06
USPC ................................................... 376/114
See application file for complete search history.

(56) References Cited

U.S. PATENT DOCUMENTS

| 2,651,727 | A |   | 9/1953 | Ehrenberg |
| 3,508,058 | A |   | 4/1970 | Frentrop |
| 4,320,446 | A |   | 3/1982 | Langford et al. |
| 5,023,769 | A |   | 6/1991 | Beland |
| 5,523,556 | A | * | 6/1996 | Meddaugh ............ G01T 1/208 |
|           |   |   |        | 250/207 |

(Continued)

FOREIGN PATENT DOCUMENTS

| EP | 2389790 A1 | 11/2011 |
| GB | 2444801 A * | 6/2008 ............ H01J 35/06 |

(Continued)

OTHER PUBLICATIONS

"Custom Capacitor Solutions to Unique Problems," Advanced Monolithic Ceramics, Inc., Created Oct. 1, 2008.

(Continued)

*Primary Examiner* — Lily C Garner
(74) *Attorney, Agent, or Firm* — Michael Dae

(57) ABSTRACT

Various embodiments for shortening the overall length of a pulsed neutron generator having a high voltage power supply are disclosed, including but not limited to, providing the plurality of stages of a high voltage power supply wrapped circumferentially or helically about a radiation generator tube. Various techniques for reducing voltage differentials and mitigating the risk of arcing in these embodiments are also disclosed.

13 Claims, 6 Drawing Sheets

(56) References Cited

U.S. PATENT DOCUMENTS

| | | | |
|---|---|---|---|
| 5,523,939 | A | 6/1996 | Stephenson |
| 5,825,024 | A | 10/1998 | Badruzzaman |
| 6,242,825 | B1 | 6/2001 | Mori et al. |
| 7,148,471 | B2 | 12/2006 | Roscoe et al. |
| 7,564,948 | B2 | 7/2009 | Wraight et al. |
| 2002/0014583 | A1 | 2/2002 | Bothner |
| 2002/0170348 | A1 | 11/2002 | Roscoe et al. |
| 2006/0070443 | A1* | 4/2006 | Pristup ................ G01P 15/0888 73/514.08 |
| 2011/0114830 | A1 | 5/2011 | Reijonen et al. |
| 2013/0208841 | A1 | 8/2013 | Perkins et al. |

FOREIGN PATENT DOCUMENTS

| | | | |
|---|---|---|---|
| JP | H10174461 A * | 6/1998 | ............... H02N 1/08 |
| WO | 2009020996 A2 | 2/2009 | |
| WO | 2009099887 A1 | 8/2009 | |
| WO | 2010090795 A1 | 8/2010 | |
| WO | 2011060282 A2 | 5/2011 | |

OTHER PUBLICATIONS

"Performance Specifications and Acceptance Testing for X-Ray Generators and Automatic Exposure Control Devices," American Association of Physics in Medicine, Report No. 14, Jan. 1985.

Third Party Protest and Claim Chart filed on Feb. 12, 2014 for Canadian Patent Application No. 2,781,094.

Supplementary European Search Report for EP Application No. 10830841.2 dated Nov. 30, 2015.

International Search Report and Written Opinion issued in the related PCT applicatoin PCT/US2010/056658, dated Aug. 2, 2011 (8 pages).

International preliminary report on patentability issued in the related PCT applicatoin PCT/US2010/056658, dated May 22, 2012 (6 pages).

Examination Report issued in the related CA application 2781094, dated Apr. 29, 2015, (5 pages).

Examination Report issued in the related CA application 2781094, dated Mar. 27, 2017, (4 pages).

Extended Search Report issued in the related EP Application 10830842.0, dated Nov. 30, 2015 (8 pages).

Examination Report issued in the related CA application 2781097, dated Apr. 27, 2015.

Third Party Protest and claim chart filed on Feb. 12, 2014 in the related CA application 2781097 dated Feb. 12, 2014.

International Search Report and Written Opinion issued in the related PCT applicatoin PCT/US2010/056660, dated Jul. 28, 2011 (8 pages).

International Preliminary Report on Patentability issued in the related PCT applicatoin PCT/US2010/056660, dated May 22, 2012 (5 pages).

Communication Article 94(3) received in the related EP Applciation 10830842.0 dated Apr. 21, 2017 (5 pages).

\* cited by examiner

Rings of Multiplying Stages

COMPACT RADIATION GENERATOR

CROSS-REFERENCE TO OTHER APPLICATIONS

This application claims priority to and the benefit of U.S. Provisional Application No. 61/261,398, filed provisionally on Nov. 16, 2009. This application also claims priority to and the benefit of U.S. Provisional Application No. 61/261,394, filed provisionally on Nov. 16, 2009.

TECHNICAL FIELD

The invention relates generally to electronic radiation generators used in oil well logging.

BACKGROUND

Ionizing radiation has been used in the oilfield for well over half a century to enable measurements not possible with other formation probing techniques (such as electrical resistivity, acoustic, electro-magnetic, NMR, etc.). The broad types or kinds of ionizing radiation include charged particles, X-rays, gamma-rays, and neutrons.

Historically, the first method employed to produce ionizing radiation for oilfield applications involved radioactive sources. These radioactive sources (e.g. $^{137}$Cs, $^{241}$Am, $^{252}$Cf, $^{238}$Pu, etc.) were chosen, based on the application, for their emitted radiation type and in quantities sufficient for the desired intensity. Few naturally occurring radioactive sources emit neutrons during their decay, generally as a consequence of spontaneous fission. One example of a radioactive material with a significant probability for spontaneous fission is $^{252}$Cf. While $^{252}$Cf is used in some applications, its short half-life of only 2.6 y is generally considered a drawback. Many neutron sources rely on the generation of neutrons through a nuclear reaction, typically the $^{9}$Be(alpha, n)$^{12}$C reaction. Such sources consist of an alpha emitter, such as $^{241}$Am or $^{238}$Pu, mixed with Be-powder. The small nuclear reaction probability necessitates the use of a large amount of radioactive alpha emitter to generate a sufficient neutron output.

Most pulsed neutron generators generate neutron radiation through the reaction of energetic deuterium with tritium (d-T) reaction. However, other reactions such as d-D and t-T can be used as well.

To overcome disadvantages involved in using radioactive sources, and to expand the range of possible measurement techniques, electronic radiation generators have been developed over the last several decades. Electronic radiation generators offer numerous benefits, including safety and high yield, over chemical naturally radioactive sources. The radiation generated is directly coupled to the energy imparted to the charged particles employed in the radiation producing reactions. As a result, electrostatic electronic radiation generators employ high voltage power supplies and high voltage insulation.

To fit the borehole geometry of the oilfield environment, electronic radiation generators are typically of a substantial length on the order of a few feet. This minimum length can become a disadvantage, constraining possible tool configurations, both in terms of fit as well as formation measurement capabilities.

Electronic generators function by accelerating and colliding charge particles in sealed "vacuum" tubes to produce the required neutrons or x-rays. At present, most of the accelerators used to produce radiation in the oilfield use direct current (DC) electric fields, operating by creating a sufficiently large voltage (potential) difference between a source of charged particles and a target. Once the source is turned ON, charged particles entering the region of high voltage (HV) are accelerated to the desired energy and caused to collide with a target to produce radiation. When either the source and/or the voltage is/are turned OFF, the radiation stops. The charged particles to be accelerated can be electrons (to produce X-rays), protons and other ions (to produce gamma rays, neutrons and other charged particles).

X-rays are generated by directing energetic electrons onto a target. The scattering of the energetic electrons on the target leads to the emission of Bremsstrahlung x-rays and characteristic x-rays of the target material.

Gamma-rays can be created through a nuclear reaction of an energetic charged particle with a suitable target material. One example is the reaction $^{19}$F(p,$\alpha\gamma$)$^{16}$O. his reaction produces high energy gamma rays (e.g. 6.13 MeV) and already takes place at proton energies below 400 keV.

The intensity and energy of the radiation produced depends on the high voltage used to accelerate the charged particles. Typically, the higher the "high voltage", the higher the intensity and/or energy of the resulting radiation. This requires use of high voltage power supplies (HVPS) capable of producing from tens to hundreds of kilovolts. The most common power supply design employed is based on the Cockcroft-Walton voltage multiplier, also known as the Greinacher multiplier. It includes an array of stages in series, shaped like a ladder, with each stage comprising a pair of capacitors and a pair of diodes (see FIG. 1).

During each ON cycle, an A/C current supplied by step up transformer 100 charges each respective capacitor 102, according to the rectification provided by the diodes 104. The maximum admissible voltage for each stage depends on the capacitor and diode component ratings as well as on the AC voltage provided by the secondary of the transformer 100. To achieve a given high voltage, a ladder is constructed such that, neglecting losses, etc., enough stages are used to sum up to the desired voltage.

One electrical design constraint for high voltage power supplies is that electrical hold off between the high voltage and ground must be sufficient over the whole length of the power supply. Given the limited diameter available in downhole tools, the stage component size must be small enough to accommodate the necessary surrounding high voltage insulation over a limited radial distance. Typically, the size of high voltage components increases with their high voltage rating. A tradeoff is made between the stage (and component) size and the necessary high voltage insulation based upon the absolute voltage to neighboring ground potential. For borehole-size radiation generators, high voltage capacitor ratings are typically around a few (e.g., five) kilovolts. Typically multi-layer capacitors are used to achieve the required capacitance, and are generally rectangular or box-shaped with radial leads. Thus, to produce from tens to hundreds of kilovolt requires a power supply with several dozens of stages. When the stages are placed end to end, the "ladder" configuration adds up to a significant overall length for the power supply.

Currently, the most frequently employed electronic radiation generator in the oilfield is the pulsed neutron generator (PNG). Aside from the supporting low voltage electronics (current and pulsing supplies), a PNG comprises a high voltage power supply 202 consisting of a step-up transformer 100 and a high voltage multiplier 216, a sealed neutron generator tube 204 and a high voltage insulation system 206. The sealed neutron generator tube 204 includes an ion source 208 which is at or near ground potential, and separated from a target 210 by an HV acceleration column. The configuration of PNG is generally cylindrical, as dictated by the borehole geometry, with the target 210 of the neutron generator tube 204 in contact with the high voltage end of the high voltage power supply 202. The necessary high voltage insulation (solid, liquid and/or gaseous or any combination thereof) surrounds the neutron generator tube 204 and high voltage power supply 202, with the entirety being contained in a hermetically-sealed pressure housing 212. Preferably, the pressure housing is cylindrical in shape. The conventional arrangement of these components is in a rectilinear configuration, where the high voltage power supply is connected in line (on one axis or close to on one axis) to the high voltage end of the neutron generator tube 204 (see FIG. 2.) The typical length of such a generator is often in the range from about 36 to 48 inches, or more.

The considerable length of the PNG can impose significant limitations on the tool design and consequently the feasibility of various measurements. Specifically, tools with limited length may not be able to make use of an electronic radiation source. Such tools include those that use pads (e.g., pad tools to measure formation density or tools in which the generator should be placed in the stabilizer blade of an LWD tool). The measurement limitations pertain to the placement of specialized radiation detectors used to measure the formation response. Many classic nuclear logging tool configurations require placing radiation shielding material (tungsten, boron and many others) as close as possible to the radiation source (i.e., PNG) with a specialized (near) detector adjacent to the shield. The detector configuration (i.e., type, size, shielding, position, etc.) is chosen based on the kind of formation measurement desired. Because of the length of the PNG including the high voltage power supply, only the neutron tube end affords close proximity to the radiation source (tube target). For most practical purposes, this limits the detector placement to a single axial direction relative to the target. If a tool is intended to perform multiple different measurements with the radiation provided by the electronic source, it is likely that not all the required detectors can be placed at the optimal axial and/or radial position. A short radiation source would allow detector placements axially on both sides of the radiation source, and thus a better independent optimization of multiple measurements through optimal placement of multiple detectors. A different approach to achieving a similar result is proposed in U.S. Pat. No. 7,148,471.

DETAILED DESCRIPTION

In the following description, numerous details are set forth to provide an understanding of the present disclosure. However, it will be understood by those skilled in the art that the present invention may be practiced without these details and that numerous variations or modifications from the described embodiments are possible.

In light of the above background discussion, it is desirable to use radiation generators, including a PNG, as short and compact as possible. This disclosure identifies approaches, methods and techniques to achieve this objective.

As described, the three main components of radiation generators are the high voltage power supply (HVPS), the radiation tube and the insulation system. Achieving any significant reduction in the HV insulation is not presently feasible as it is assumed that for a given operating high voltage, the best insulators are employed in the best possible manner (quantities, thicknesses, arrangements, etc).

A reduction in the length of the radiation tube is also not presently feasible for similar reasons, that is, that the length and diameter reductions are tube design and manufacturing-specific. Thus, in order to produce a more compact radiation generator, the focus of the present disclosure is on reducing the length/size of radiation generators by modifying the design and configuration/layout of the HVPS and/or the design and configuration/layout of the radiation generator.

According to embodiments of the present disclosure, the linear layout of the HVPS can be segmented and wrapped circumferentially, in annular fashion, around the radiation generating tube. In a first embodiment, the HVPS can be segmented and wrapped circumferentially around the radiation generating tube. This results in a wrap-around power supply (WASP). In a most preferred embodiment of the present disclosure, a multi-stage high voltage power supply, such as a Cockcroft-Walton styled voltage multiplier, would be employed, however parallel work on single-staged voltage multipliers indicates that single-staged voltage multipliers are also contemplated in the present disclosure, as any other axially collocated supplies could be used.

Figure 3C:
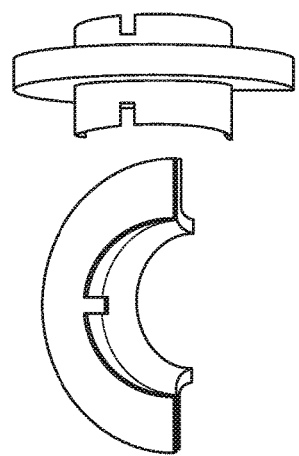
FIG. 3A-C illustrates a wrap-around power supply in accordance with embodiments of the present disclosure.
Figure 3B:
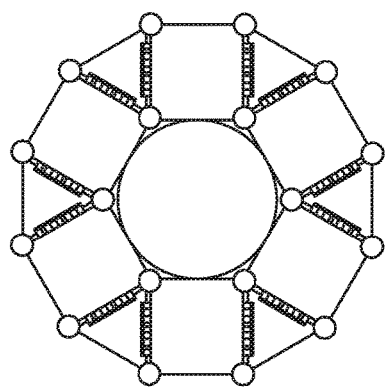
Figure 3A:
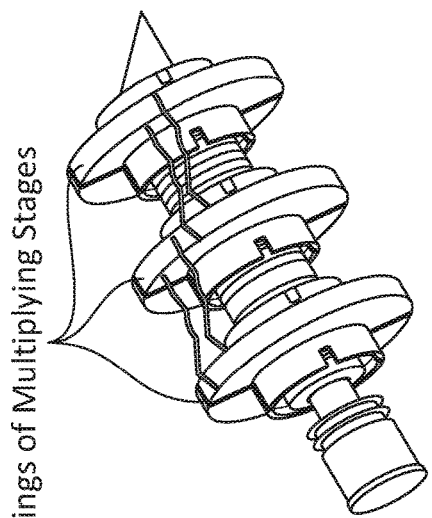

As shown in FIGS. 3A-3C, the stages are mounted on an annular backbone (an illustrative embodiment of which is shown in the photo of FIG. 3C) which, itself, is mounted annularly around the radiation generating tube (as shown in FIG. 3A mounted about an X-ray tube). The design and number of each ring power supplies depends on the desired output voltage, the component size and rating, the physical dimensions of the tube, and the like. Each ring is connected to the next with high voltage wires. FIG. 3B shows an embodiment for a single stage ring, showing the configuration of the capacitors and diodes in a circumferential arrangement.

Figure 4:
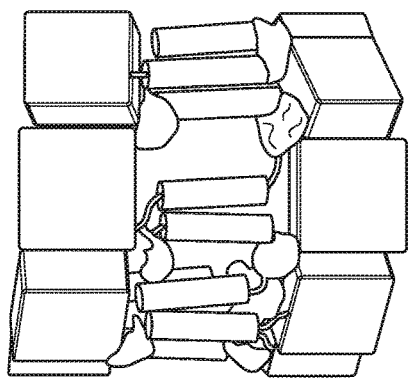
FIG. 4 shows an embodiment of a high voltage ladder power supply in a "belt" configuration that can be used to circumferentially wrap around the radiation generating tube in accordance with embodiments of the present disclosure.

The wrap-around power supply results in a high voltage gradient at opposing ends of the same ring, and a relatively large radial space required by the wrap-around power supply design. According to embodiments of the present disclosure, the components can optionally be laid flat, stringing the HV ladder power supply in a "belt" configuration that can be used to circumferentially wrap around the radiation generating tube (see FIG. 4). The interconnecting diodes can be relocated along the sides of the capacitors to reduce the required outer diameter.

Figure 5:
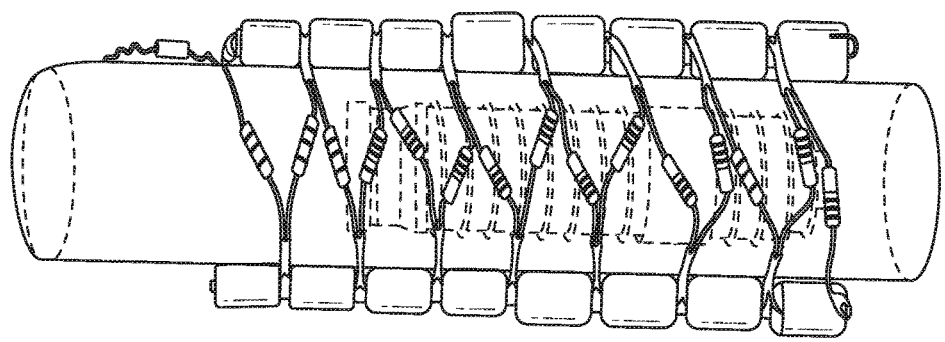
FIG. 5 shows still another embodiment wherein the belt configuration shown in FIG. 4 may be wound helically around the radiation generating tube.

To mitigate the high voltage potential difference at opposing ends of the annulus with a WASP design, the belt configuration may optionally be wound helically around the radiation generating tube as shown in FIG. 5. The configuration of FIG. 5 also illustrates how the capacitor bodies can be turned side-ways to minimize the cumulative length of all stages.

Each of these approaches offers, to varying degrees, the benefit of gradually evolving the high voltage axially alongside the radiation generating tube—avoiding, among other things, significant electric gradients between the tube and the collocated power supply.

Figure 6:
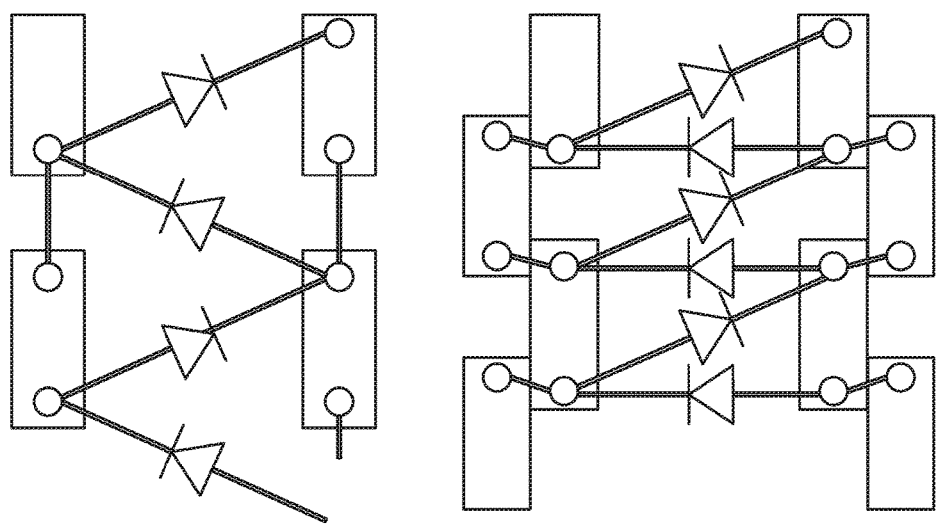
FIG. 6 shows a side-by-side comparison of a linear arrangement of capacitors on the left and a double-layer staggered arrangement of capacitors on the right in accordance with embodiments of the present disclosure.

To achieve additional compactness, capacitors can be double layered in a staggered fashion. With the double-layer staggered capacitor approach, care must be taken to avoid excessive overlap of the double layered capacitors (as shown on the right in FIG. 6 compared with a linear arrangement of capacitors on the left) to avoid electrical arcing that can occur with the close proximity of opposing voltages.

With the market entry of higher voltage rating capacitors (10 kV instead of 5 kV), shorter power supplies (i.e., with fewer stages), which can approximate a similar length to the radiation tube, becomes possible. Such higher voltage rating capacitors can be obtained, for example, from Novacap, Inc.

Figure 7:
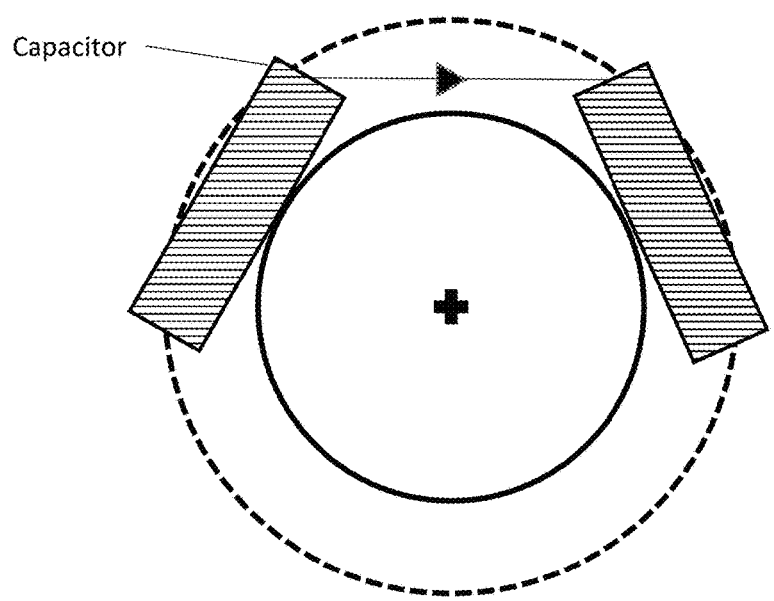
FIG. 7 shows a rectilinear high voltage power supply substantially co-located with the radiation generator tube in an eccentered configuration in accordance with embodiments of the present disclosure.

By using any of the approaches described herein or combining them, HVPS designs can include rectilinear configurations that are simpler and easier to manufacture. To minimize the maximum outside diameter of the assembly, a rectilinear HVPS collocated with the tube may be configured in an eccentered configuration (as shown in FIG. 7) in an embodiment of the present disclosure, wherein the tube is located off the main axis of the housing.

Other considerations with compact radiation generators include the tailoring of the axial distribution of the electric field between the sealed generator tube and the HVPS. It is preferable that the linear evolution of the electric field on the HV ladder axis is optimized with respect to the voltage evolution on the radiation tube axis located underneath to prevent destructive voltage gradients.

The development of curved capacitors enables various embodiments of the present disclosure to include a further reduction in the radial dimensions of the generator with a collocated power supply. Curved capacitors allow a more efficient use of the available radial clearance by minimizing the diameter of the supply.

Figure 8:
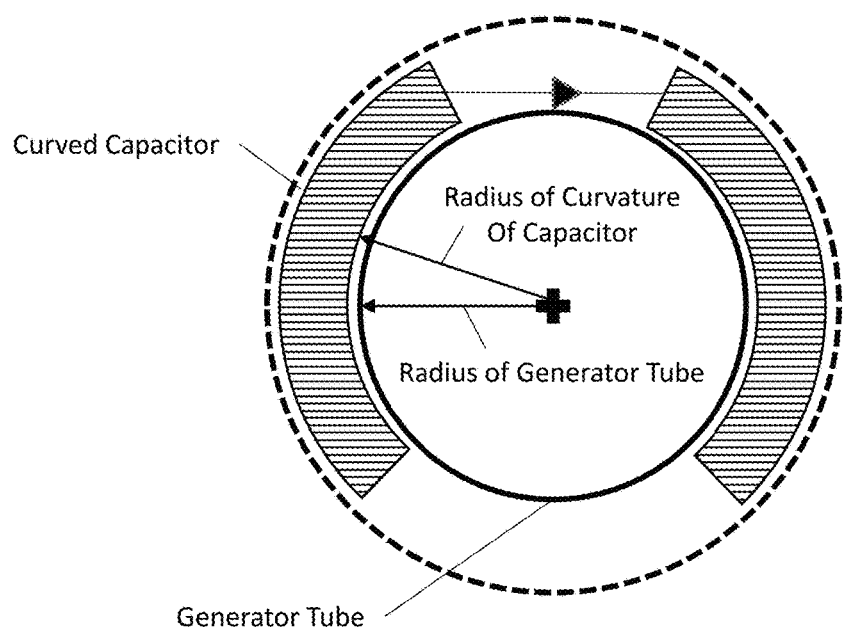
FIG. 8 shows a centered design (in comparison with the eccentered configuration of FIG. 7) in which the radiation generator tube is located on the main housing axis and is nearly fully circumferentially surrounded by the high voltage power supply employing curved capacitors in accordance with embodiments of the present disclosure.

One embodiment may be referred to as a centered design, in which the generator tube is located on the main housing axis and is nearly fully circumferentially surrounded by the HVPS (specifically the capacitors) as shown in FIG. 8. This approach is analogous to the above discussed WASP configuration, but employing curved capacitors. For symmetry and design-for-manufacture, the interconnecting diodes can be located on both diametrically opposed locations (top/bottom), provided extra radial leads are provided on the capacitors. However, unlike the eccentered embodiment shown in FIG. 7, the centered design does not permit the neutron tube to be radially positioned any closer to the formation.

Additional length reductions can be achieved by locating the HV step-up transformer outside of the radiation generator, at a less critical location in the tool. Locating the step-up transformer outside of the radiation generator requires that the radiation generator bulkhead be fitted with two space consuming high voltage feedthroughs for providing the AC input to the multi-stage high voltage power supply. Relatively high voltage lines carrying the AC signal can induce EM noise on nearby electronics if not properly shielded, and incur significant parasitic losses.

Figure 2:
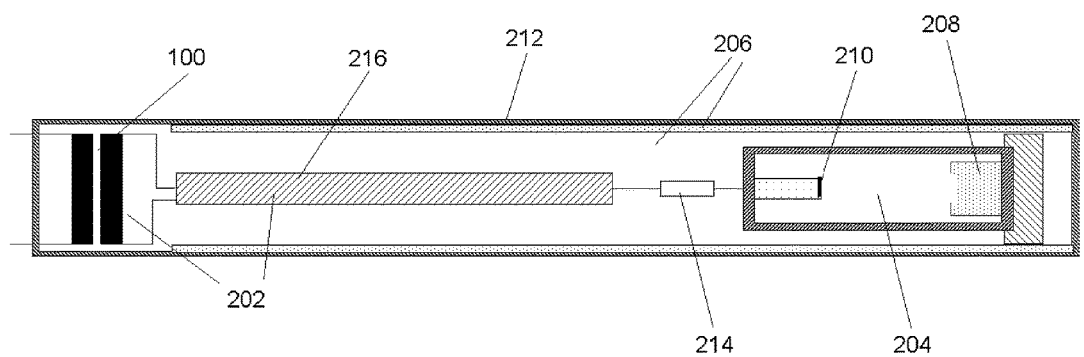
FIG. 2 is a side-view of a prior art pulsed neutron generator

On another topic, coupling a high voltage supply to a radiation generator requires the use of protective resistors; also called surge resistors (see 214 in FIG. 2). The surge resistors serve to protect the high voltage power supply electronics from damaging arc events occurring in the radiation generator tube. Surge resistors are placed in series between the high voltage output of the high voltage power supply and the radiation generator tube. Surge resistors are designed to momentarily withstand the full high voltage drop across their total length. As such, space needed for surge resistors can account for a significant portion of the overall length of the device. In embodiments of the present disclosure, the series of individual surge resistors (typically 0.25-inch diameter×0.5 inch long) can be laid out in a zigzag pattern, spaced so as to avoid HV arcing and/or creep. Alternately, the use of custom more robust carbon-doped ceramic resistors instead of carbon composition resistors means fewer resistors (and therefore, less length) are necessary to achieve the same level of protection.

Figure 1:
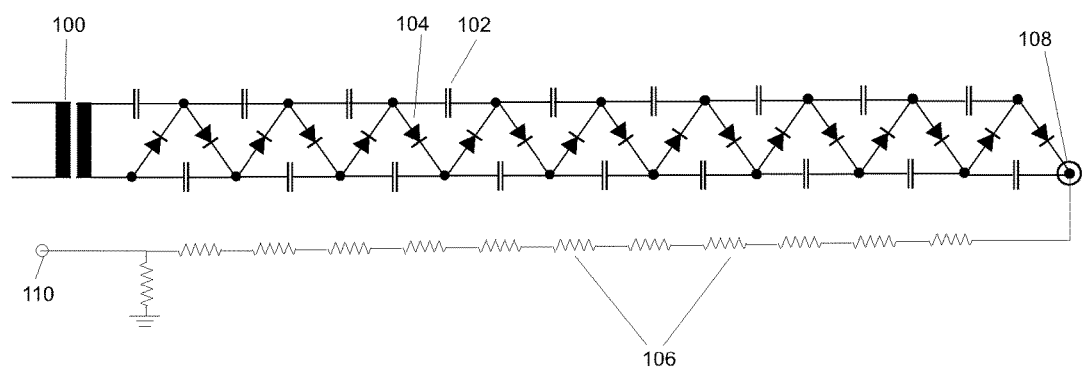
FIG. 1 is a schematic for a prior art power supply design based on the Cockcroft-Walton voltage multiplier, also known as the Greinacher multiplier.

Turning now to the details of the design of the stages of the high voltage ladder (FIG. 1), a component other than the capacitor that impacts the overall length is the bleed resistor/voltage divider. A bleed resistor string (106) is used to provide a measurement of the high voltage at the input to the generator tube by "bleeding" a small amount of current into a resistor connected to ground. A HV divider formed by the bleed resistors in this fashion provides an input (110) for the HV measurement. The bleed resistor(s) are typically strung in series from the HVPS output (last stage) to ground, where a divider sense resistor (112) is located (refer back to FIG. 1 for an illustration of the bleed resistors). In addition to providing a precise measurement of the output voltage (for regulation purposes), the HV divider serves to safely discharge the HVPS when it is turned off.

When employing techniques in accordance with various embodiments of this disclosure, the overall HV ladder length is reduced, and the bleed resistors (which are typically thick-film ink on a ceramic substrate) see greater axial electrical stress over their body length, which can detrimentally affect the accuracy of the resistance (voltage coefficient effect, i.e. the resistance becomes dependent on the voltage across it) and thus the accuracy of the measurement of HV. To make the resistor(s) less susceptible to such electrical stresses due to the length reduction, the path length of the thick-film resistor serpentine needs to be maintained. This can be achieved by increasing (maximizing) the width available on the body to accommodate a broader serpentine thick-film trace.

Figure 9:
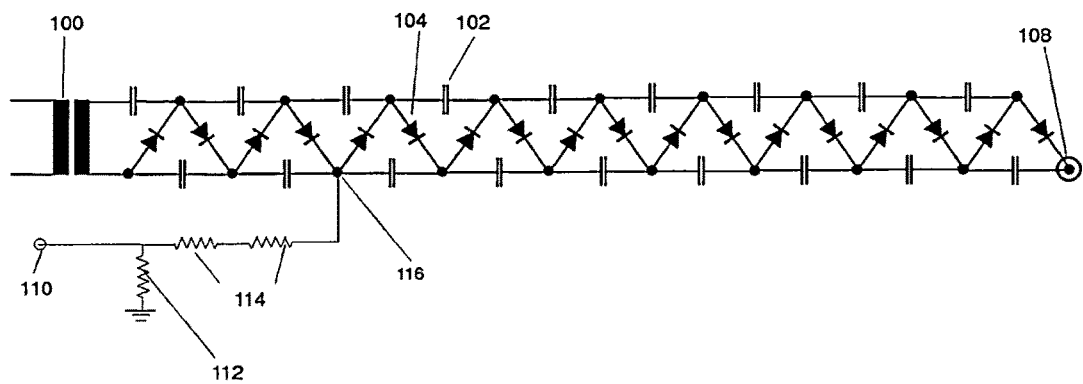
FIG. 9 shows a schematic for a high voltage measurement inferred from a voltage tap tied in to a low stage in accordance with embodiments of the present disclosure.

In an alternative embodiment, a stage tap measurement 116 can be made (see FIG. 9) by connecting a high voltage wire to one of the lowest stages of the HVPS. Using similar voltage divider circuitry 114 and 112, the HV output 110 can be inferentially related to the ratio of the total number of stages and the stage position tapped. Thus, the burden of precision can be lifted from the bleed resistor(s), allowing such resistor(s) to be shortened substantially or even eliminated all together.

Figure 10:
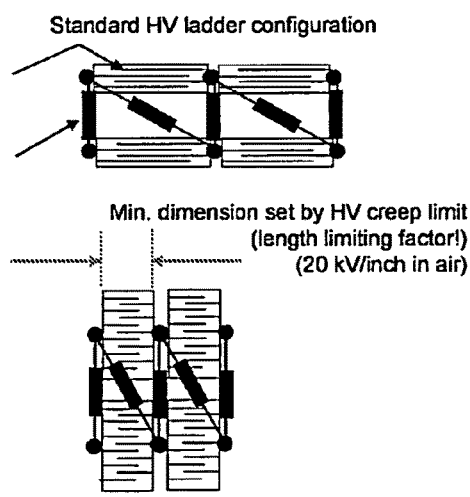
FIG. 10 is an illustrative shorter capacitor design involving custom-shaped capacitors optimized the cross-sectional space available in accordance with embodiments of the present disclosure.

As the overall length of the HV ladder is reduced, consideration should be given to the other component which significantly limits any length reduction, i.e., the capacitor. In the rectilinear configuration, the capacitors are generally oriented such that the ladder length is the sum of each capacitor's radial lead-to-radial lead body length. Thus, any reduction in a capacitor's lead-to-lead design length will greatly reduce the overall length of the HV ladder given the multitude of capacitors used. The main factors influencing the lead-to-lead separation for a capacitor are the capacitance required and the voltage rating. The capacitance required is dictated by the design load of the radiation tube (the higher the tube current requirement, the greater the capacitance needed). The voltage rating factor includes both the spacing between the layers of a multilayer capacitor (which will also impact capacitance) and the HV creep along the capacitor body between the radial leads (at high potential). Thus, for a given capacitance value, as the lead-to-lead spacing is reduced, the other dimensions of the capacitor must grow to keep the overall volume constant. Custom-shaped capacitors can be designed to optimize the cross-sectional space available. The change in the capacitor aspect ratio must be guided by the lead-to-lead HV creep hold off as well as capacitor manufacturing constraints (binder curing). An example of a shorter capacitor design is shown in FIG. 10.

Figure 11:
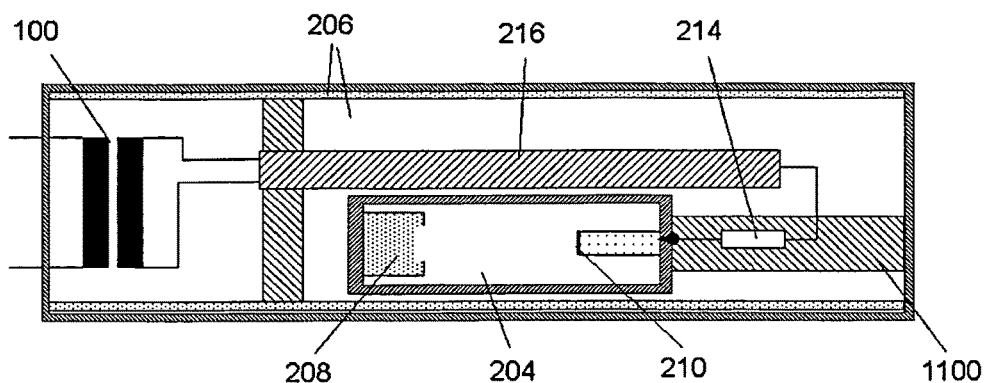
FIG. 11 is an illustrative design of a compact generator involving a high voltage supply mounted alongside the neutron generator tube.

The shorter HV ladder resulting from the considerations above allows the construction of a much shorter PNG that allows the placement of nuclear sensors at optimal axial spacings on both sides of the generator. FIG. 11 depicts a possible embodiment in which the high voltage ladder 216 is mounted parallel to the neutron generator tube 204. The high voltage end of the ladder and generator tube being supported at the high voltage end by an insulator 1100, which may contain the surge resistor(s) 214.

Figure 12:
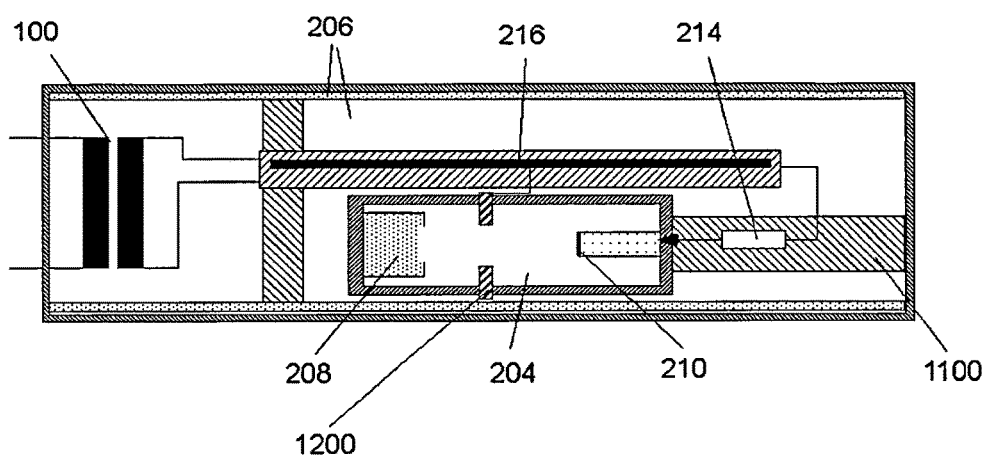
FIG. 12 is an illustrative design of a compact generator employing an intermediate electrode neutron generator tube.

A variant of the generator shown in FIG. 11 is shown in FIG. 12. In this embodiment the neutron generator tube has an intermediate electrode 1200, which may be connected to an intermediate voltage of the high voltage ladder 216 (as described in commonly owned U.S. patent application Ser. No. Reference PCT/US10/56566 filed Nov. 16, 2009).

Additionally, thermal considerations are another concern in the design of compact radiation generators in accordance with embodiments of the present disclosure, particularly with neutron generators that are known to consume a significant amount of power and generate waste heat. Because of the thermal sensitivity of the electric components which make up the HVPS, care is taken to shield them from excessive temperature. This can be accomplished by, depending on the available clearance, either by making use of thermal insulators, or thermal conductors to shunt the heat flux to other cooler regions of the generator.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A device that produces neutron radiation, x-ray radiation, gamma-ray radiation, or a combination thereof through the reaction of energetic charged particles accelerated in a DC electrostatic field with a target on which the charged particles impinge, comprising:
   a. a sealed generator tube comprising:
      1. a source generating charged particles; and
      2. a target onto which the charged particles are directed;
   b. a high voltage supply comprising a series of multiplying stages that is configured to apply a high voltage between the source and the target to accelerate the charged particles to a predetermined energy level before the charged particles impinge on the target, wherein at least some stages of the series of multiplying stages are formed in two or more rings disposed circumferentially in annular fashion around the sealed generator tube, wherein the two or more rings comprise more than one multiplying stage;
   wherein the high voltage supply comprises a step-up transformer operatively coupled to the series of multiplying stages, wherein each stage of the series of multiplying stages comprises a pair of rectifying diodes and a pair of capacitors, wherein one pair of capacitors of a first multiplication stage of the high voltage supply overlaps with another pair of the capacitors of a second multiplication stage at least partially along a radial axis of the series of multiplication stages.

2. The device according to claim 1, wherein the high voltage supply does not extend axially beyond ends of the sealed generator tube.

3. The device of claim 1, wherein the length of the device is overall less than or equal to twenty inches (20 in.).

4. The device of claim 1, wherein each single set of the two or more rings comprises a plurality of the multiplying stages, and each single set of the two or more rings is operatively coupled to an adjacent ring such that the series of multiplying stages of the plurality of rings results in a summed high voltage at an output of the high voltage supply.

5. The device of claim 1, wherein a portion of the high voltage supply comprises a rectilinear configuration located along one or more sides of the sealed generator tube.

6. The device of claim 5, further comprising one pair of capacitors located at a first azimuth of the generator tube and a second pair of capacitors located at a second azimuth of the generator tube, wherein the diodes connect the one pair of capacitors and the second pair of capacitors.

7. The device of claim 1, wherein each capacitor of the pair of capacitors comprises a geometry that is substantially curved with an inner radius of curvature equal to or greater than a radius of curvature of an outside of the sealed generator tube.

8. The device of claim 1, further comprising a protective resistor coupling between the output of the high voltage supply and the target of the sealed generator tube.

9. The device of claim 1, further comprising a high voltage divider coupling the output of the high voltage supply and ground operable to measure a target high voltage.

10. The device of claim 1, further comprising a voltage divider configured to measure the voltage at an intermediate point in the high voltage supply from which the high voltage is inferred.

11. The device of claim 10, wherein the voltage divider is configured to measure the voltage at a second stage with respect to ground of the high voltage supply.

12. A radiation logging tool, comprising
 a) a tool housing;
 b) a compact generator that produces neutron radiation, x-ray radiation, gamma-ray radiation, or a combination thereof through a reaction of energetic charged particles accelerated in a DC electrostatic field with a target on which the charged particles impinge;
 c) a power supply operatively coupled to the compact generator,
 d) control circuitry operatively coupled to the compact generator;
 wherein the compact generator comprises:
  a. a sealed generator tube comprising:
   1. a source generating charged particles; and
   2. a target onto which the charged particles are directed; and
  b. a high voltage supply located side-by-side at least partially with the sealed generator tube that is configured to apply a high voltage between the source and the target to accelerate the charged particles to a predetermined energy level before the charged particles impinge on the target, and wherein the high voltage supply comprises a plurality of multiplying stages, wherein the plurality of multiplying stages comprises at least two capacitors, wherein the at least two capacitors overlap at least partially in a radial direction from a center of the sealed generator tube.

13. The device of claim 12, wherein the plurality of multiplying stages are wrapped at least 360 degrees around the sealed generator tube in a substantially helical fashion.

* * * * *